May 25, 1965 E. H. JACOBSEN 3,185,409
FOLDABLE ROTARY WING AIRCRAFT
Filed Dec. 10, 1962 6 Sheets-Sheet 1
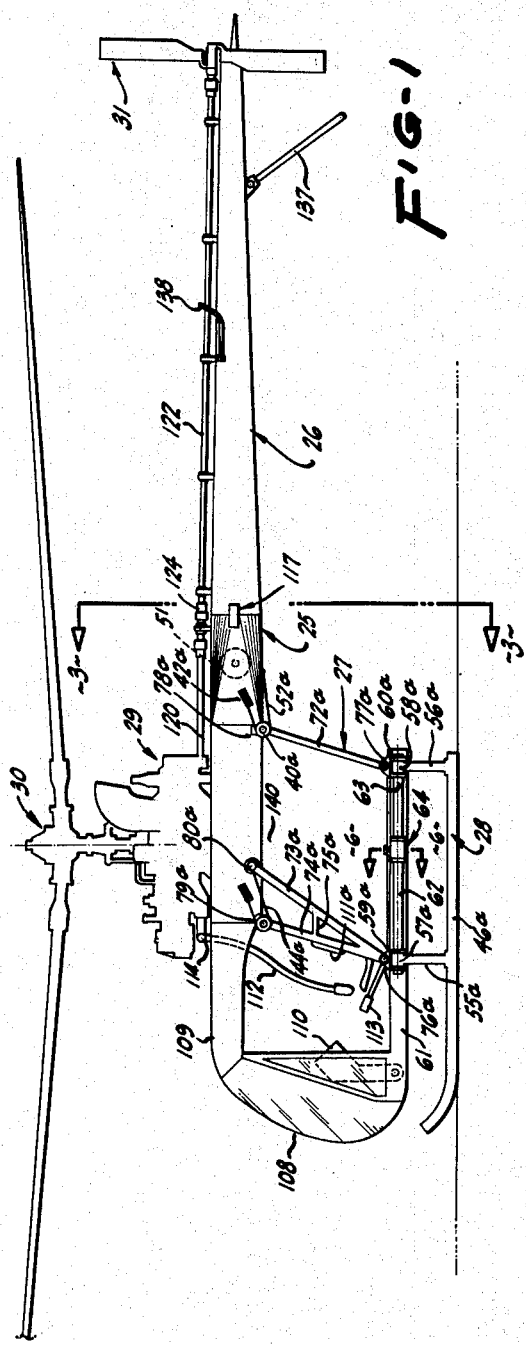
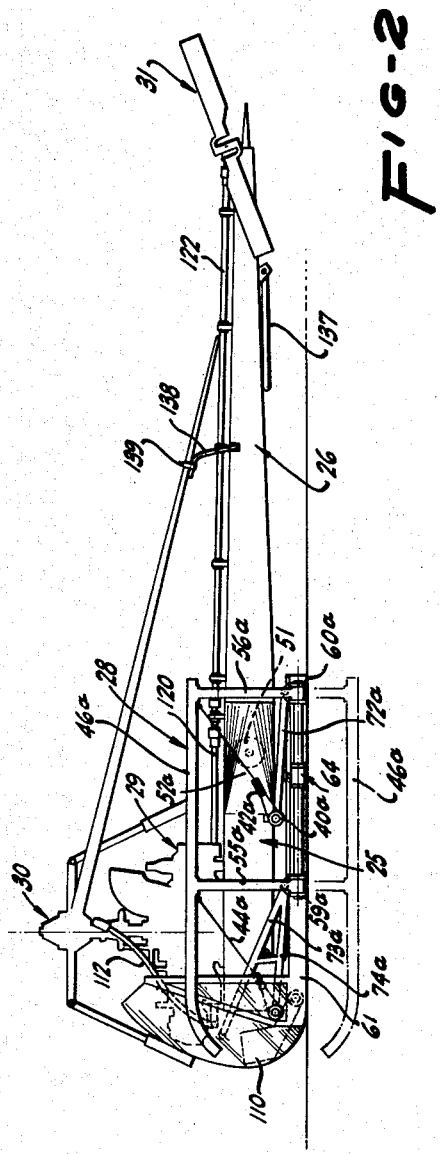
INVENTOR.
EDWARD H. JACOBSEN
BY
ATTORNEYS

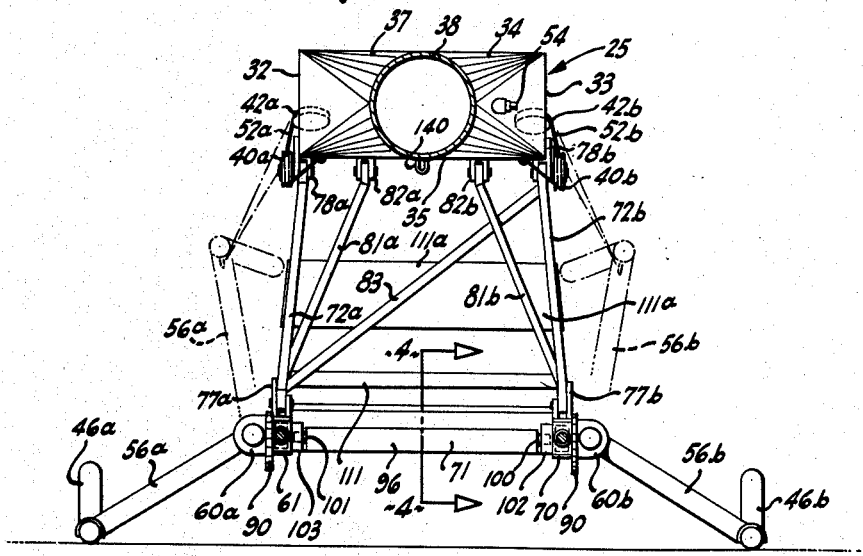
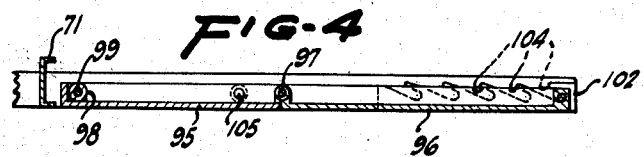
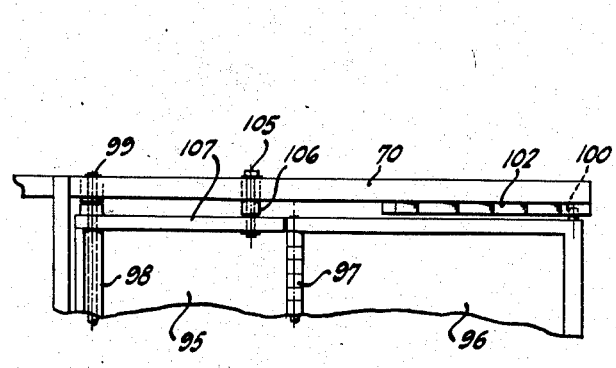
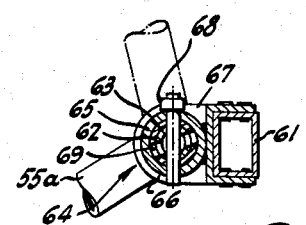
INVENTOR.
EDWARD H. JACOBSEN

May 25, 1965 E. H. JACOBSEN 3,185,409
FOLDABLE ROTARY WING AIRCRAFT
Filed Dec. 10, 1962 6 Sheets-Sheet 3
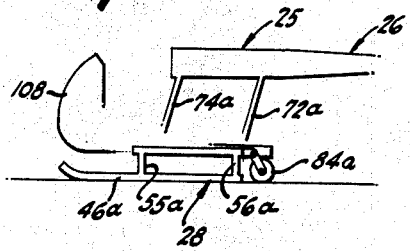
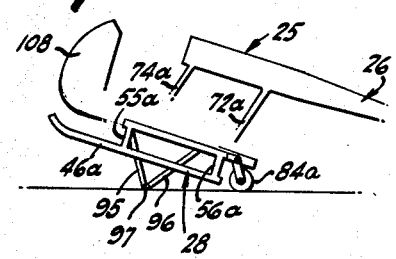
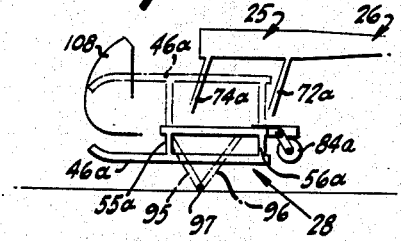
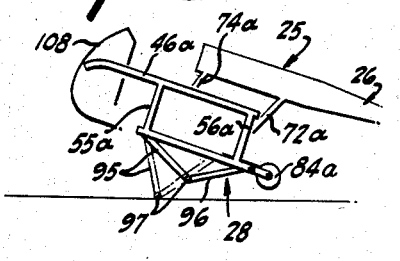
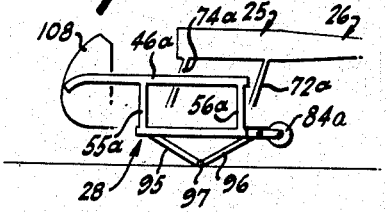
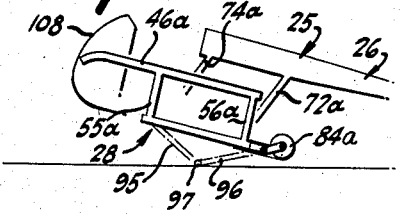
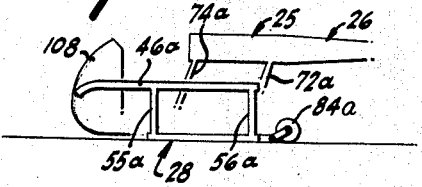
INVENTOR.
EDWARD H. JACOBSEN
BY
ATTORNEYS May 25, 1965 E. H. JACOBSEN 3,185,409
FOLDABLE ROTARY WING AIRCRAFT
Filed Dec. 10, 1962 6 Sheets-Sheet 4
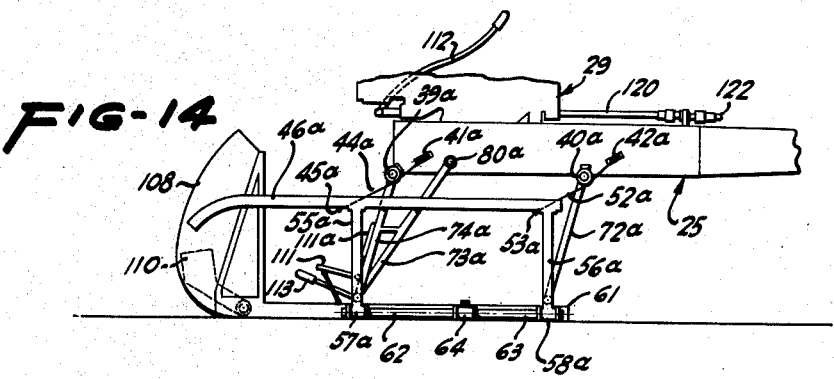
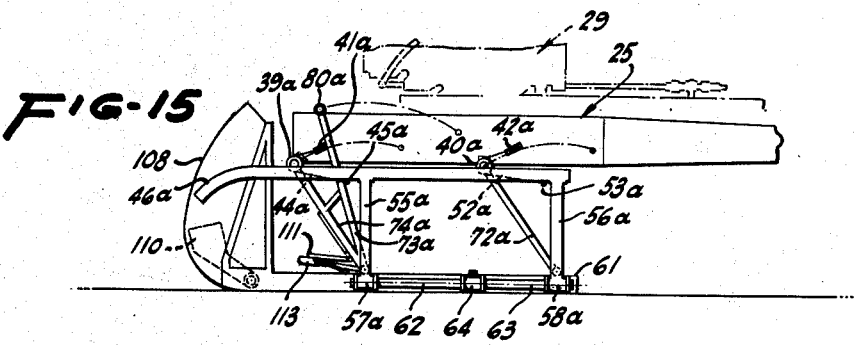
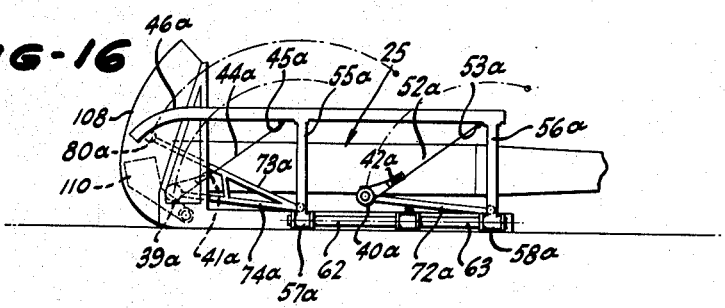
INVENTOR.
EDWARD H. JACOBSEN
BY
*Bialos & Schlemmer*
ATTORNEYS May 25, 1965 E. H. JACOBSEN 3,185,409
FOLDABLE ROTARY WING AIRCRAFT
Filed Dec. 10, 1962 6 Sheets-Sheet 6
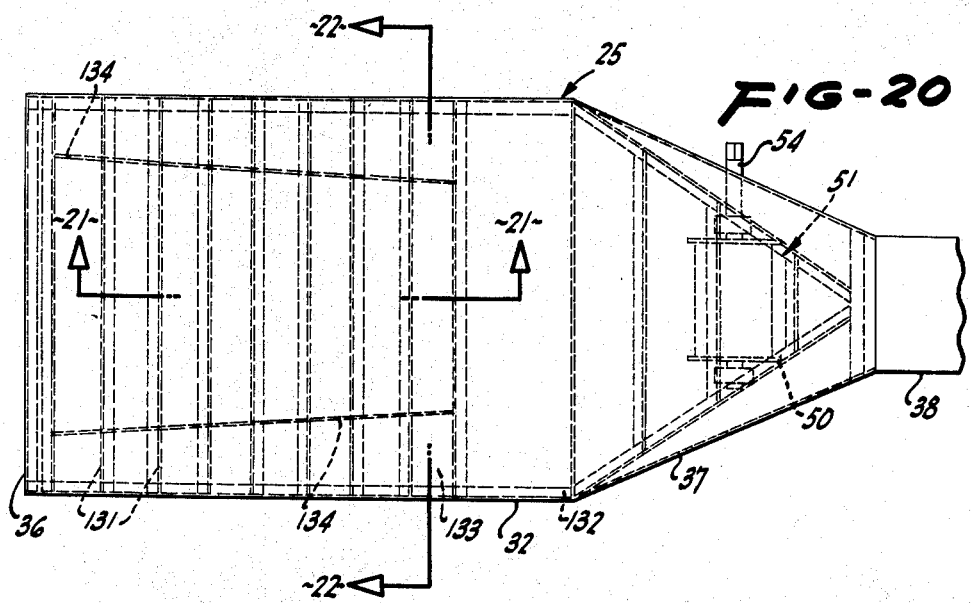
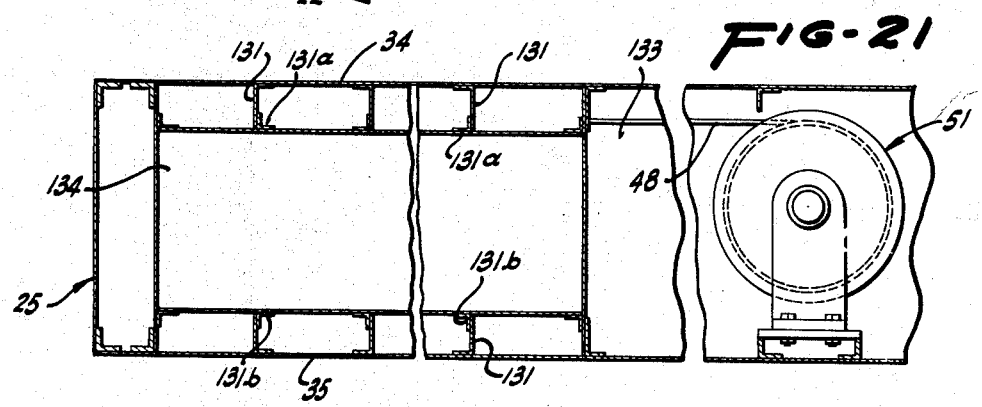
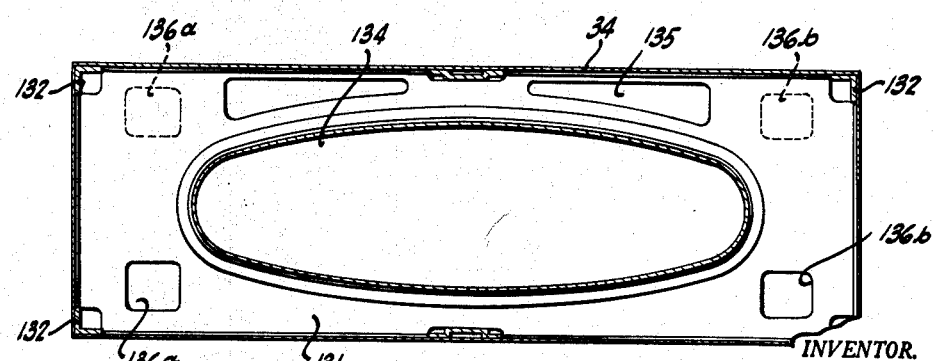
INVENTOR.
EDWARD H. JACOBSEN
BY
Bialos & Schlemmer
ATTORNEYS _United States Patent Office_  3,185,409
Patented May 25, 1965

3,185,409
FOLDABLE ROTARY WING AIRCRAFT
Edward H. Jacobsen, Menlo Park, Calif., assignor, by mesne assignments, to Hiller Aircraft Company, Inc., Menlo Park, Calif., a corporation of Delaware
Filed Dec. 10, 1962, Ser. No. 243,507
34 Claims. (Cl. 244—17.11)

This invention relates to aircraft, and more particularly to rotary wing aircraft such as helicopters, autogyros and the like.

An object of the present invention is to provide a rotary wing aircraft having a cargo compartment located directly below the center of life of the aircraft, and in which the compartment is selectively convertible into a cargo carrier, a personnel transport, a litter carrier for medical evacuation, an airborne weapons platform, and which also enables the aircraft to be used as an aerial crane.

Another object of the invention is in the provision of an aircraft that is quickly and easily foldable between a compact unit for storage, transport, concealment and handling and an erect, flight-ready unit all without the necessity of employing special tools and equipment.

Still another object is that of providing an aircraft in which the landing gear thereof is retractable when relieved of its aircraft-supporting function into general adjacency with the sides of the aircraft; and in which the fuselage section of the aircraft is foldable downwardly into the space otherwise defining the cargo and pilot's compartment and into nesting relation between the opposite corresponding sections of the retracted landing gear.

Yet another object is to provide an aircraft having a large-volume cargo compartment, access to which is afforded through wide and substantially unobstructed access openings along the sides and rear thereof.

A further object of the invention is in the provision of a rotary wing aircraft having a large-volume cargo compartment, access to which is afforded to through a substantially unobstructed access opening of large dimensions at the rear thereof; and in which the aircraft is equipped with a longitudinally extending tail boom, substantially no portion of which is disposed below the ceiling or upper extremity of the cargo compartment, and which is mechanically isolated from the load-supporting floor of the cargo compartment so that no force couples are established therebetween and, as a result, the tail boom can be suspended from the fuselage above the ceiling of the cargo compartment by means of a cantilever support.

Yet a further object is that of providing an aircraft that is a self-contained unit in the sense that retraction of the landing gear and folding of the fuselage are both accomplished without the need for equipment other than that provided by the aircraft itself; and in which the aircraft becomes a giant jack when it is desired to retract the landing gear—being alternately rockable about longitudinally spaced fulcrums, by a force of relatively small magnitude applied to the outer end portion of the tail boom, into an elevated position in which the landing gear is relieved of its support function to permit retraction thereof.

Additional objects and advantages of the invention will become apparent as the specification develops.

An embodiment of the invention is illustrated in the accompanying drawings in which—

FIG. 1 is a side view in elevation of an helicopter embodying the invention;

FIG. 2 is a side view in elevation of the helicopter in the folded condition thereof;

FIG. 3 is a transverse sectional view taken generally along the plane 3—3 of FIG. 1;

FIG. 4 is a longitudinal sectional view taken along the plane 4—4 of FIG. 3;

FIG. 5 is a broken top plan view of the platform illustrated in FIG. 4;

FIG. 6 is an enlarged vertical sectional view taken along the plane 6—6 of FIG. 1;

Figure 17:
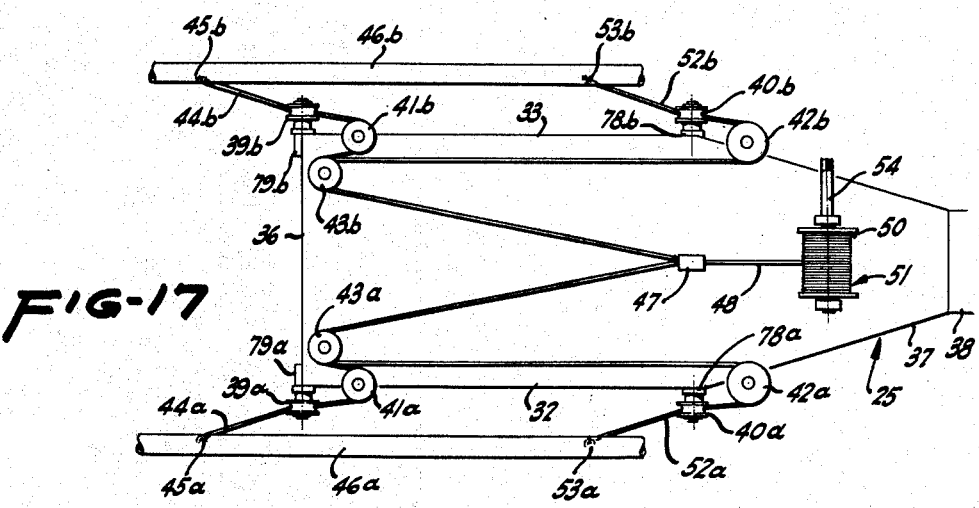
Figure 18:
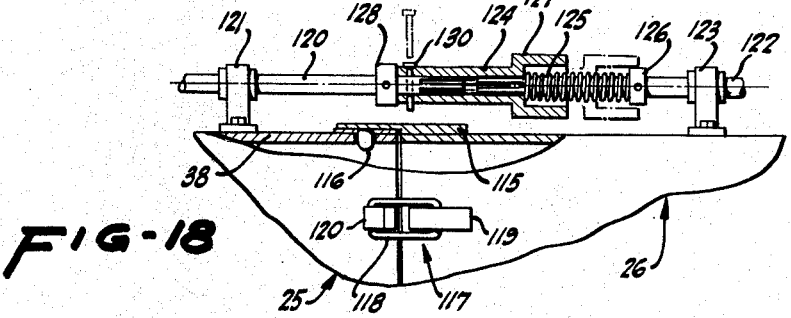
Figure 19:
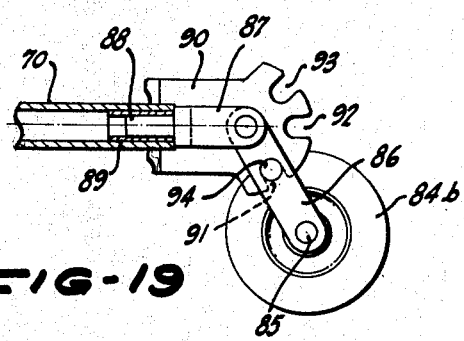

FIGS. 7–13, inclusive, are largely diagrammatic views illustrating a typical sequence of steps that may be followed in folding or retracting the landing gear of the helicopter;

FIGS. 14, 15 and 16, are each a broken side view in elevation illustrating the sequential steps which may be followed in moving or folding the fuselage of the helicopter into its collapsed condition within the space otherwise defining the pilot's and cargo compartment of the aircraft;

FIG. 17 is an enlarged, broken top plan view of the winch and cable system used in moving the fuselage into and out of its collapsed condition;

FIG. 18 is an enlarged, broken side view in elevation (with certain of the parts being shown in section) of the connection of the tail boom to the fuselage;

FIG. 19 is an enlarged side view in elevation of one of the wheel fulcrums;

FIG. 20 is an enlarged top plan view of the fuselage;

FIG. 21 is a longitudinal sectional view taken along the plane 21—21 of FIG. 20; and FIG. 22 is a transverse sectional view taken along the plane 22—22 of FIG. 20.

The present invention is exemplified in the drawings by a rotary wing aircraft in the form of a helicopter which, in general, comprises the usual major components. It therefore includes a fuselage section 25 equipped with a tail boom 26, a structural composition defining a cargo and cabin compartment designated generally with the numeral 27, a landing gear 28, an engine 29 supported upon the fuselage section 25, a rotary wing or rotor blade assembly 30, and a tail rotor assembly 31. For purposes of the present invention the engine 29, rotor blade assembly 30 and rotor column therefor may be conventional; and, for example, the engine 29 may be of the turbine type and the rotor blade assembly 30, rotor column and control linkages may be of the type disclosed in Patent No. 2,534,353.

The various components comprised by the helicopter are interconnected and arranged so that it can be selectively positioned in a flight condition or erect condition of use, as shown in FIG. 1, or in a collapsed and folded condition for storage and transport, as shown in FIG. 2. As will be described in detail hereinafter, movement of the helicopter between the erect and collapsed conditions thereof is effected in two stages. First, the landing gear 28 is released from its extended position of use and is retracted or folded upwardly along the sides of the compartment 27 in a sequence of steps illustrated in FIGS. 7–13, inclusive; and second, the fuselage 25 is folded forwardly and downwardly into the collapsed condition shown in FIG. 2 in a sequence of steps illustrated in FIGS. 14–16, inclusive. Thereafter, and if desired, the tail boom 26 may be disassembled from its interconnection with the fuselage 25 and the various blades of the rotor blade assembly may be folded, as shown in FIG. 2, or in certain instances the blades might be removed entirely. The reverse sequence is followed in erecting the helicopter and, consequently, the fuselage and tail boom assembly are first elevated and thereafter the landing gear is folded downwardly and secured in the erect or extended position thereof.

Prior to describing in detail the various steps of the folding and unfolding operations, the structural composition of the helicopter will be elaborated and in this respect the fuselage section 25 (as shown best in FIGS. 1–3 and 20–22) is for the most part a rectangularly shaped component having longitudinally extending side walls 32 and 33, top and bottom walls 34 and 35, a forward wall 36, and an inwardly and rearwardly tapered transition portion 37 terminating in a substantially cylindrical connector 38 adapted to be secured to the tail boom 26. Supported by the fuselage 25 (see FIGURE 17 in particular) along the side walls 32 thereof are a pair of sheaves 39a and 40a respectively oriented adjacent the forward wall 36 and transition portion 37. Similarly carried by the fuselage 25 along the side wall 33 thereof are a pair of sheaves 39b and 40b. All of the sheaves 39 and 40 are vertically disposed and are rotatably supported spaced distances outwardly from the associated side walls 32 and 33 of the fuselage.

Respectively arranged with the sheaves 39a and 40a are a pair of pulley wheels or sheaves 41a and 42a rotatably supported by the fuselage and extending outwardly through openings provided therefor along one side thereof. A substantially identical pair of sheaves 41b and 42b arranged with the sheaves 39b and 40b are rotatably supported by the fuselage and extend outwardly through openings along the opposite side thereof. Rotatably supported interiorly of the fuselage adjacent the forward wall 36, are a pair of pulley wheels 43a and 43b that are horizontally disposed. The sheaves 41a and 41b are interposed between the respectively associated pulley wheels 39a–43a and 39b–43b and are angularly oriented, as shown most clearly in FIG. 1, to effect a transition between the vertical outer sheaves 39 and horizontal inner sheaves 43.

Entrained about the pulley wheel composition 39a, 41a and 43a is a cable 44a, one end of which may be releasably anchored by a connector 45a to the horizontally oriented, ground-engaging skid 46a of the landing gear 28. The cable 44a at its opposite end is secured to a connector or buckle 47 located within the fuselage 25, and the buckle 47 in turn is secured to a cable 48 that is wrapped about the drum 50 of a winch denoted generally by the numeral 51. Entrained about the pulley wheel composition 39b, 41b and 43b is a cable 44b releasably secured at one end by a connector 45b to the ground-engaging skid 46b of the landing gear 28. The cable 44b is also fastened to the buckle 47.

Entrained about pulley wheels 40a and 42a is a cable 52a releasably secured to the landing skid 46a by a connector 53a. The cable 52a extends about the sheave 42a, runs forwardly along the side wall 32 of the fuselage, passes about the sheave 43a (which is a double-groove sheave) and is secured to the buckle 47. A cable 52b along the opposite side 33 of the fuselage is releasably secured to the landing skid 46b by a connector 53b, extends over the sheaves 40b, 42b and 43b (a double-groove sheave) and is secured to the buckle 47. The winch 51, and more particularly the drum 50 thereof, is equipped with a shaft 54 that is journalled for rotation in supports carried by the fuselage and extends outwardly through a wall thereof and has a splined outer end adapted to be releasably connected to a crank (not shown). Upon rotation of the shaft 54, the cable 48 will be wound onto or off of the drum 50, depending upon the direction of rotation, which then will either increase or decrease the tensile force applied to the skids 46a and 46b by the respectively associated cables 44a and 52a, and 44b and 52b. The cables also apply forces to the sheaves 39 and 40 useful in manipulation of the fuselage between the positions thereof shown in FIGURES 1 and 2.

As shown most clearly in FIGS. 1, 2 and 17, the landing skid 46a is an elongated tubular element curved upwardly at its forward end and equipped at spaced intervals therealong with a pair of supports or struts 55a and 56a welded or otherwise rigidly related at one end thereof to the landing skid. At their opposite ends, the struts 55a and 56a are respectively equipped with collars 57a and 58a that are interposed between the spaced legs of associated clevis elements 59a and 60a rigidly carried by a longitudinally extending frame element 61 of the helicopter. The collars 57a and 58a are rotatable with respect to the clevis elements 59a and 60a to enable the landing skid 46a to be swung between the erect position of use thereof, illustrated in FIG. 1, and the folded or retracted position thereof illustrated by full lines in FIG. 2.

As is indicated in FIG. 6, the landing gear 28, is a torsion type landing gear in which the ground engaging skids thereof are resiliently displaceable upwardly against the forces defined by the torsion elements to cushion the fuselage and associated components of the helicopter from landing shocks. A landing gear of the torsion type which may be used in the helicopter being considered, is disclosed in copending patent application Serial No. 186,723, filed April 11, 1962. However, with respect to the present invention, such torsion composition includes a first outer tube 62 that extends through the clevis element 59a and is welded or otherwise rigidly secured to the collar 57a. The tube 62 terminates adjacent the clevis 60a, and coaxially mounted therein is an inner torque tube 63 extending through the clevis element 60a and collar 58a and is welded or otherwise rigidly secured to the latter.

Interposed between the clevis elements 59a and 60a is a locking or latch structure 64, that in the form shown comprises a sleeve 65 circumjacent the tube 62 and secured at opposite ends thereof to the legs 66 of a bracket 67 which is fastened to the frame element 61. The sleeve 65 is provided with a pair of diametrically oriented openings or apertures therethrough adapted to receive therein a pin or key 68. The torque tubes 62 and 63 are provided with a pair of passages therethrough that intersect each other and define an included angle of approximately 75 degrees. One such passage is designated in FIGURE 6 with the numeral 69—the other such passage being concealed by the pin 68 positioned therein. The pin 68 may be a quick-release, positive-lock, single-action pin conventional in the aircraft industry.

In the arrangement of the elements shown in full lines in FIG. 6, the landing gear is in an extended position and is positively located thereat by the pin 68 which extends through one such passage in the torque tube composition and through the aligned openings in the sleeve 65. When it is desired to fold the landing gear upwardly and into adjacency with the compartment 27, the pin 68 is withdrawn from all of the openings, the landing skid 46a is then free to be swung upwardly as shown by broken lines in FIGURE 6, and the landing skid is locked in such retracted position by the pin 68 which is then inserted into the openings in the sleeve 65 and passage 69 in alignment therewith. The landing gear 28 is symmetrical with respect to the longitudinal axis of the aircraft and, therefore, the landing skid 46b is related to the frame element 70 in precisely the same manner that the landing skid 46a is related to the frame element 61. In view of this, the same numerals are employed where appropriate but with the suffix "b" added thereto to identify the respectively corresponding components and no further description thereof need be provided. The frame elements 61 and 70 are rigidly interconnected by one or more transverse braces 71, as shown in FIGURES 3 and 4.

The fuselage section 25 is supported above the lower frame or floor of the helicopter by a plurality of tubular uprights or tension struts, there being three along each side of the aircraft and two that are inwardly inclined (see FIGURE 3). Referring to FIG. 1, such struts on one side of the aircraft are respectively designated with the numerals 72a, 73a and 74a, the first of which is located in adjacency with the landing gear strut 56a and the others being rigidly connected to each other at their lower ends and being disposed in general adjacency with the landing gear strut 55a. The struts 73a and 74a diverge upwardly and together with cross strut 75a extending therebetween, have an inverted generally A-shaped configuration. At their unitary lower end, the struts 73a and 74a are pivotally connected to the frame element 61 by a racket 76a that is welded or otherwise fixedly connected to the frame element 61. In a similar manner, the strut 72a is pivotally connected by a bracket 77a to the frame element 61, and the bracket 77a may be welded or otherwise rigidly secured thereto.

Adjacent their upper end portions, the struts 72a and 74a are pivotally connected to the fuselage 25 at longitudinally spaced locations therealong by brackets 78a and 79a rigidly secured thereto. The strut 73a is releasably connected to the fuselage 25, in the configuration illustrated in FIG. 1, by a pin 80a which may be of the quick-release type as heretofore described. As shown in FIG. 3, an additional strut 81a is rigidly connected to the strut 72a adjacent the lower end thereof and extends upwardly and inwardly therefrom toward the undersurface 35 of the fuselage section 25 to which it is pivotally secured by a bracket 82a.

In a substantially identical manner the fuselage section 25 is secured along the opposite side thereof by a plurality of struts to the lower frame or floor of the aircraft, and in FIG. 3, two such struts are illustrated and are designated with the numerals 72b and 81b. It will also be seen in this figure that a diagonally oriented sway brace or bar 83 extends between the lower end portion of the struts 73a and 74a, and the upper end portion of the strut on the opposite side of the aircraft that corresponds to the element 74a shown in FIG. 1.

Quite evidently, removal of the pin 80a and its counterpart on the opposite side of the aircraft releases the constraining struts 73, and results in what may be termed a parallelogram configuration comprised by the rear struts 72 (and struts 81 connected thereto), the forward struts 74, the floor or lower frame of the aircraft and the fuselage section 25. All such elements are pivotally interconnected, and, consequently, the fuselage 25 is supported for swinging movements relative to the lower frame or floor of the fuselage through an arcuate distance of substantially 180°. The limit of such movement in one direction is illustrated in FIG. 2 which shows the fuselage after it has been swung forwardly and downwardly into nesting relation with the compartment 27. The limit of the permissible movement in the opposite direction is not illustrated in that the maximum desired displacement in such direction is shown in FIG. 1. The various components are fixedly secured in the erect or flight position illustrated in FIG. 1 by the locking pins 80a and angularly disposed struts 73 which rigidly constrain the fuselage section 25 against swinging movement in either direction. Movement of the fuselage is effected by the pulley wheel and cable system heretofore described, and a typical sequence of steps exemplifying such movement will be considered in detail hereinafter.

It will be appreciated that the landing gear 28, and in particular the landing skids 46a and 46b thereof, cannot be swung between the extended and folded positions thereof unless the weight of the helicopter is supported by structure other than the landing gear. The helicopter being considered in detail herein has a self-contained arrangement for relieving the landing gear 28 of its support function, and such arrangement will now be described.

Such arrangement includes a pair of fulcrum systems, one of which includes a pair of pivot wheel assemblies, 84a and 84b, the latter of which is shown in detail in FIG. 19. The pivot wheels may be permanently or removably carried by the aircraft, and in the specific embodiment being considered, such wheels are removable. Considering the wheel assembly 84b in detail, the tire-equipped wheel thereof is rotatably supported upon an axle 85 secured to a link or support structure 86 that is pivotally received between the spaced legs of a bifurcated bracket 87 equipped with an end portion 88 of reduced cross section telescopically received within a liner 89 mounted within the hollow frame element 70. The end portion 88 and inner passage through the liner 89 are both of cylindrical cross section which permits the wheel 84b, link 86 and bracket 87 to be pivoted relative to the frame element 70.

Secured to the frame element 70 along the outer side thereof is a latch structure 90 rigid therewith, and equipped at its outer or rear end with a fan-shaped section provided with a plurality of angularly spaced recesses extending inwardly from the rear edge thereof. In the structure shown there are three such recesses, and for identification they are respectively denoted with the numerals 91, 92 and 93. Adapted to be selectively received within such recesses is a latch pin 94, welded or otherwise secured to the link 86 and extending laterally therethrough. Thus, the wheel 84b may be positively located at any one of a plurality of angular positions relative to the latch structure 87 and frame element 70. Various positions of the pivot wheels 84 are illustrated in FIGS. 7 through 13, inclusive.

It will be appreciated that the wheel 84b may be removed from the frame element 70 by rotating such wheel, the link 86 and bracket 87 upwardly and inwardly to withdraw the latch pin 94 from the recess 91 and then withdrawing the cylindrical end portion 88 of the bracket from the liner 89. The wheel 84b may be relocated with the latch pin 94 in the recess 91 by reversing this procedure; or it may be relocated with the latch pin 94 in the recess 92, by axially aligning the link 86 and bracket 87 prior to inserting the end portion 88 of the bracket into the liner 89. Since the latch pin 94 extends outwardly from the link 86 in both directions, it will be apparent that the latch pin is conveniently located within the recess 93 when this is desired.

The second fulcrum assembly comprises the floor of the cargo section of the compartment 27, and is illustrated best in FIGS. 4 and 5. Such floor is defined by a platform having two sections, respectively designated with the numerals 95 and 96, which are pivotally connected along their contiguous edges by hinge structure 97. The platform section 95 along the forward edge thereof is equipped with a transversely oriented tube 98 pivotally receiving therein a shaft 99 that extends outwardly therefrom, through openings provided therefor in the frame elements 61 and 70, and is anchored in position with respect thereto by means of nuts threadedly engaging the shaft at the opposite ends thereof. The tube 98 is pivotally supported by the shaft 99 and, consequently, these two elements define a hinge composition pivotally supporting the platform section 95 along its forward edge portion.

The platform section 96 along the rear edge thereof is equipped at its opposite sides with a pair of laterally extending latch pins 100 and 101 that are respectively receivable within recesses provided therefor by a pair of rack latches 102 and 103 respectively carried by the frame elements 70 and 61. The racks 102 and 103 may be welded or otherwise affixed to the frame elements. Each of the racks has a plurality of angularly disposed recesses 104 that are spaced longitudinally from each other, and the pins 100 and 101 are selectively receivable within the recesses provided by the respectively associated racks. The pins may be withdrawn and inserted into such recesses by permitting the platform sections 95 and 96 to pivot inwardly with respect to each other about the common hinge 97 while the platform section 95 swings downwardly about the pivot axis defined by the tube 98 and shaft 99. Various positions of the platform sections are illustrated in FIGS. 7 through 13, inclusive.

Ordinarily the platform sections 95 and 96 are oriented in the generally planar configuration shown in FIGS. 4 and 5, and are maintained therein by one or more latch pins 105. The latch pin 105 illustated in FIGS. 4 and 5 slidably extends through a boss or sleeve 106 carried by the frame element 70 and projects into and through an opening alignable therewith formed in the longitudinal wall 107 of the platform section 95. Such an arrangement locks the platform section 95 in the position shown in FIGS. 4 and 5 and thereby prevents pivotal movement of the platform sections relative to each other, and pivotal movement of the platform section 95 relative to the frame elements 61 and 70. The latch pin 105 may be releasably held in position by any suitable and convenient means, as for example, the cotter pin illustrated or the pin may be of the conventional quick-release type. Ordinarily, each of the platform sections 95 and 96 will be equipped with a top wall or cover (preferably removable) to more easily receive and support cargo thereon, but for purposes of simplifying the drawings such cover has been omitted. Additionally, cargo lashings, seats, litter supports, etc. with which the cargo compartment may be equipped have been omitted for clarity.

The cockpit or pilots' section of the compartment 27 is defined in part by a transparent window or nose blister 108 secured to and extending upwardly from the cabin floor, and in part by a transparent roof or canopy 109 that is removably secured to the fuselage 25 and nose window 108 by standard cowl fasteners or other conventional latching structure. Pivotally supported within the cockpit is an instrument console 110 movable between the generally vertical position thereof shown in FIG. 1 and the forwardly-folded position shown in FIG. 2. One or more seats 111 are provided in the cockpit and are pivotally supported by the struts 74 for movement between the position of use, shown in FIG. 1, and a folded position, shown in FIG. 2, in which the seat extends along the plane defined by struts 74. A backrest 111a secured to and extending between the struts 74 forms a part of the seating facility.

The usual controls requisite for rotary wing aircraft are also present in the pilots' cabin, and the cyclic and collective pitch control sticks 112 and 113 are also selectively movable between the positions of use thereof shown in FIG. 1 and the folded position illustrated in FIG. 2. In the aircraft being considered, the control stick 112 is of the overhead type (although this is not necessary) and normally extends downwardly into the cockpit through the canopy 109. However, it may be swung upwardly about a pivot axis 114 when the canopy is removed to free the cabin of the presence of such stick which would otherwise interfere with forward and downward movement of the fuselage section 25. The control stick 113 is inherently movable downwardly and into adjacent relation with the floor of the compartment and, consequently, no extraordinary support structure need be provided therefor.

The tail boom 26, is removably carried by the fuselage 25 and, in particular, by the converging end section or transition section 37 thereof. As shown most clearly in FIG. 18, the fuselage and tail boom at their plane of joinder have substantially the same cross-sectional configurations and areas and define a smooth, substantially uninterrupted outer surface thereat. The boom 26 is equipped with a forwardly extending finger 115 having a depending dog 116 adapted to extend through an opening or aperture provided therefor in the fuselage, as shown in FIGURE 18. The finger, dog and opening positively locate the boom relative to the fuselage and thereby properly align the mating sections of a plurality of releasable fasteners 117 which may be of conventional construction. For example, the fasteners may be of the type having a ring or eye 118, carried by a pivotal latch 119 secured to the tail boom, slidable under a lip 120 carried by the fuselage. The ring 118 is maintained in the latched position shown in FIG. 18 because of the over-center characteristics of the latch 119.

A drive shaft 120 extends along the upper surface of the fuselage, and is rotatably supported by one or more journals 121 secured thereto. As is well known, the shaft 120 is coupled to the tail rotor power take-off from the engine 29. In a similar manner, the tail rotor shaft 122 extends along the upper surface of the tail boom 26, and is rotatably supported by a plurality of journals 123 secured thereto. The shaft 122 is drivingly connected to the tail rotor assembly 31 in any conventional manner so as to impart power thereto when the shaft is rotated.

The shafts 120 and 122 are drivingly interconnected adjacent the plane of joinder of the boom and fuselage, and to effect such driving interconnection, the adjacent ends of the shaft are splined. Coaxially circumjacent the splined end portions of the shaft 120 and 122 is a coupling sleeve 124 that is similarly splined and is biased forwardly into overlying relation with the shaft 120 by a helical spring 125 that, at one end, seats against an abutment or stop collar 126 secured to the shaft 122 and, at its other end, seats within an enlarged cup 127 formed integrally with the sleeve 124 at the rear end thereof. Forward displacement of the sleeve 124 under the resilient biasing force of the spring 125 is limited by an abutment or stop collar 128 carried by the shaft 120.

A locking key 130 removably extends through alignable openings provided by the sleeve 124 and shaft 120 when the shafts 120 and 122 are coupled together to prevent inadvertent displacement of the sleeve against the biasing force of the spring. It will be apparent that the shafts 120 and 122 are drivingly coupled by the sleeve 124 when the various elements are in the position shown in FIG. 18, but such driving interconnection may be released, when it is desired to remove the boom 26, by withdrawing the pin 130 and sliding the sleeve 124 rearwardly to withdraw the same from the splined end portion of the shaft 120. The pin 130 may be maintained in the position shown by cotter pin, snap ring, or other conventional means.

Details concerning the structural composition of the fuselage section 25, are illustrated in FIGS. 21 through 22; and as shown in these figures, the fuselage is a structurally rigid component comprised of a plurality of longitudinal spaced, transversely oriented bulkheads 131 each of which is reinforced by vertically spaced channels 131a and 131b respectively located in adjacency with the top and bottom walls 34 and 35 of the fuselage. A plurality of longitudinally extending, generally L-shaped channels 132, located along the respective longitudinal corner portions of the fuselage, are welded or otherwise fixedly secured to the transversely extending bulkheads 131. The outer walls of the fuselage are secured to such channels and bulkheads and define a compartment 133 therewithin.

The bulkheads 131 have central openings therethrough in which is mounted a liner forming a fuel tank 134. The tank 134 tapers inwardly and rearwardly and, as a result, is slightly smaller in cross section at its rear end than at the forward end thereof. The tank, or liner forming the same, is appropriately secured relative to the bulkheads and is spaced from the top wall 34 extending therealong by a distance sufficient to provide clearance for the various cables secured to the buckle 47. The bulkheads 131 have a transversely elongated opening 135 interposed between the tank 134 and top wall 34 of the fuselage section through which the cables 44 and 52 extend in passing between the sheaves 43 and connector buckle 47; and additional openings 136a and 136b are also provided through the bulkheads to respectively pass therethrough the lengths of the cables 52a and 52b that extend between the respectively associated sheaves 42a–43a and 42b–43b. The openings 136a and 136b may progressively decrease from front to rear in their spacing from the bottom wall 35 of the fuselage section to enable the cables to traverse a forwardly and upwardly inclined path.

In its erect condition the aircraft functions as a substantially conventional helicopter and is flown and manipulated in the usual manner. However, for storage and transport it is foldable into a compact package which not only reduces the volumetric displacement thereof, but also facilitates handling, maintenance checks, repairs, etc. when the fuselage 25, engine 29, rotor assembly 30 and other functional components are lowered toward the ground into easy reach of workmen.

A sequence of steps that may be followed in folding the landing gear upwardly is illustrated in FIGS. 7–13, and these figures will be considered in particular in describing such sequence. FIG. 7 may be taken to be the initial position of the helicopter, and in this position, the landing gear is extended and is supporting the entire aircraft. In FIG. 7 the pivot wheels 84 are in position, having been inserted into the frame elements 61 and 70 with the latch pins 94 being located in the recess 91 (as shown in detail in FIG. 19). Thus, the pivot wheels are in their lowermost position.

The aircraft is then handled as a giant jack with the tail boom 26 serving as the jack handle, and it is forced downwardly and into adjacency with the ground, the tail skid 137 which is pivotally secured to the tail boom having been retracted into the position shown in FIG. 2. The consequent rocking motion occurs about the pivot wheels 84 which, then, serves as and define a fulcrum. Since the boom 26 is quite long, the lever arm defined thereby is of substantial magnitude and enables the aircraft to be rocked into the position shown in FIG. 8, by the efforts of a single workman. In this respect it should be noted that the center of gravity of the aircraft is just forward of the fulcrum or wheels 84 and, more particularly, is in substantial alignment with the rotor assembly 30 and especially the rotor column thereof. Therefore, the lever arm through which the weight of the aircraft effectively acts is quite short relative to the length of the tail boom.

The keys 105 having been removed from engagement with the platform section 95, such section is free to swing downwardly about its hinge axis, and the platform section 96 may then be manipulated so as to insert the pins 100 and 101 thereof into a convenient slot 104 in the respective racks 102 and 103. Usually such slot will be the one nearest the hinge 97. Positioning the pins 100 and 101 in this manner causes the platform section 95 and 96 to have a generally V-shaped configuration, as shown in FIG. 8, with the hinge 97 forming the base thereof of this configuration. Evidently, the platform sections 95 and 96 are rigidly constrained in this position by the interrelation of the pins 100 and 101 with the slots 104 which are angularly disposed and have lips or edge portions that overhang the pins to prevent upward displacement thereof.

The boom 26 is then urged upwardly which causes the aircraft to pivot or swing about the fulcrum now defined by the hinge 97 of the platform sections 95 and 96, whereupon the major component of the aircraft weight is supported at such fulcrum through the platform sections, sufficient constraint being provided by the workmen adjacent the rear end portion of the boom 26 to balance the aircraft. As shown in FIG. 9, the landing gear 28 and ground-engaging skids 46 thereof are then relieved of their load-supporting function and are spaced above the ground. Therefore, upon removal of the latch pins 68, the skids 46 may be swung upwardly as shown in FIGS. 10–13 into adjacency with the compartment 27. The various components of the landing gear are then locked in such upwardly folded or retracted position by reinserting the locking pins 68 which will then be received within the passages 69 (see FIG. 6).

In the particular aircraft being considered, the landing skids 46a and 46b extend rearwardly to a location forward of the wheels 84, and when the aircraft is initially rocked in a clockwise direction into the position shown in FIG. 8, such rocking motion occurs over the terminal end portions of the skids 46. Were this not the case it would be difficult to locate the wheels 84 in the position thereof shown in FIG. 7 since the wheels should clear the ground slightly to permit such positioning thereof. Also, it will be appreciated that the platform sections 95 and 96 should be of sufficient length to project downwardly beyond the plane defined by the landing skids 46 by a distance great enough to elevate the skids above the ground when the aircraft is rocked in a counter clockwise direction into the position shown in FIG. 9.

After the landing gear has been folded upwardly, the aircraft is again rocked in a clockwise direction to bring the wheels 84 into engagement with the ground whereupon such wheels essentially support the aircraft. The position of the wheels may be changed, as shown in FIG. 10, prior to this rocking motion, in which event the pins 94 are seated within the recesses 92. The pins 100 and 101 are then withdrawn from the slots 104 and are reinserted into another such pair of slots which are more remote from the hinge 97. This repositioning of the platform sections is shown in FIG. 10, and as a result thereof, the platform sections establish a larger angle therebetween and are considerably more flat than in their prior position. The aircraft is then rocked in a counter clockwise direction to bring the hinge 97 into engagement with the ground, and again the major component of the aircraft weight is supported by the platform sections, as shown in FIGURE 11. The wheels 84, being relieved of their weight-supporting function, are repositioned so that the pins 94 thereof seat within the recess 93.

The aircraft is again rocked in a clockwise direction by depressing the boom 26 which brings the wheels 84 into engagement with the ground and releases the platform sections 95 and 96 so that the pins 100 and 101 may be withdrawn from the slots 104 and relocated, as shown in FIG. 4, such that the platform sections have a planner configuration. The aircraft is then permitted to rotate in a counter clockwise direction whereupon the entire floor thereof engages the ground and provides the support for the helicopter. The sequence of steps are followed in a reverse manner to lower the landing gear 28 into its erect position.

It will be apparent that the helicopter in its entirety becomes a giant jack when the landing gear 28 is either raised or lowered, and the relatively great weight of the aircraft is readily manipulated through the lever system defined by this jack. Irrespective of whether the aircraft is being rocked in a clockwise or counter clockwise direction, or about the fulcrums defined by the wheels 84 or hinge structure 97, the lever arm through which the weight of the aircraft acts is materially shorter than the lever arm (that is the boom 26) through which the manual force is applied. In the case of the hinge 97 being the fulcrum, the mechanical advantage is somewhat greater than when the wheels 84 perform this function because the hinge in substantially all positions of the platform section lies very close to the axis of the rotor column or, more specifically, a vertical axis through the center of gravity of the aircraft, while the wheels 84 are more remote therefrom. The aircraft is then, a self-contained mechanism providing the means through which its entire weight is removed from the landing gear and the landing gear retracted or elevated from engagement with the ground to permit manipulation of the skids 46 between the erect and folded positions thereof.

FIGS. 14–16 depict a sequence of steps that may be followed in moving the fuselage into its folded or collapsed position, and FIG. 14 may be taken to exemplify the initial position of the fuselage. It will be noted by comparing FIGS. 1 and 14 that after the landing gear has been folded upwardly, the outer end portion of the cables 44 and 52 are respectively secured to the fasteners 45 and 53 carried by the landing skids 46. When the landing skids are in their erect position, it is generally convenient to secure the cables 44 and 52 to appropriate fasteners carried along the fuselage, as shown in FIG. 1, for otherwise the cables would extend downwardly along the sides of the compartment 27 and could interfere with free and convenient access thereto.

After the cables have been so secured to the landing gear, the cables are passed under the pulley wheels or sheaves 40 and 41, and the winch is then manipulated as necessary to make the cables taut. The cables in such position are shown in FIG. 14, and they essentially support the fuselage and the weight carried thereby which permits the pins 80 to be withdrawn from the fuselage thereby releasing the struts 73 from connection therewith. Quite apparently, once the pins 80 are withdrawn the weight of the fuselage and its associated elements tends to rotate the same in a clockwise direction, but rotation in such direction is prevented by the cables because of their engagement with the sheaves 39 and 40 along the undersides thereof.

The shaft 54 of the winch 51 is then rotated in a direction which will wind a greater length of the cable 48 onto the drum 51. As a result of this, the cables 44 and 52 are shortened, which necessitates a reduction in the distance between the fasteners 45 and sheaves 41, and also between the fasteners 53 and sheaves 42. Necessarily, then, the fuselage 25 is shifted or displaced forwardly or toward the left, as seen in FIG. 14, until the struts 72 and 74 are vertically disposed or, in other terms, until the upper points of pivotal connection of the struts to the fuselage are in respective vertical alignment with the points of pivotal connection of such struts to the floor or frame elements 61 and 70.

The fuselage is held in this position momentarily by the workmen and the winch 51 is rotated slightly in the opposite direction to provide slack in the cables 44 and 52 which are then positioned along the upper surface of the sheaves 39 and 40, as shown in FIG. 15. The fuselage 25 is then shifted forwardly or toward the left as viewed in FIG. 15, until the entire weight thereof is carried by the cables 44 and 52. Thereafter, the drum 50 of the winch is rotated in a direction to release or unwind a greater length of cable 48 therefrom, which effectively lengthens the cable 44 and 52, thereby permitting the fuselage to descend into its fully folded position, shown in FIG. 16, in which the fuselage and a substantial portion of the engine 29, nests between the upwardly folded landing gear—occupying the space otherwise defined by the cargo and pilot's compartment.

The fuselage 25 is erected by carrying out such steps in reverse order, and it will be appreciated that when the fuselage is in its partially elevated position with the struts 72 and 74 vertically disposed, the cables 44 and 52 will be located along the underside of the sheaves 39 and 40 so that the weight of the fuselage is again supported by the cables as the fuselage is further displaced in a clockwise direction and until the pins 80 are reinserted into the fuselage. Thereafter, the struts 73 rigidify the fuselage, floor and strut composition. The control stick 112 and instrument console 110, both of which must be moved into their retracted positions before the fuselage is folded downwardly, may again be erected, and the canopy 109 replaced and secured to the fuselage and nose window 108.

The tail boom 26, can be removed, if desired, either before or after the fuselage is folded downwardly simply by releasing the fasteners 117, removing the pin 130 and displacing the sleeve 124 rearwardly to withdraw the same from the splined end portion of the shaft 120. Ordinarily, removal and replacement of the boom will be effected after the fuselage is lowered into its folded position. The rotor blades of the aircraft may be removed, or as a convenient alternative, they may be folded into the position shown in FIG. 2 in which they extend generally along the fuselage and tail boom and may be secured in this position by a hook structure 138 pivotally carried by the fuselage and which is swingable upwardly and into latching engagement with a strap 139 wrapped about the rotor blades. As shown in FIG. 2, the tail skid 137 is pivotally carried by the fuselage and may be retracted into adjacency therewith before the fuselage is lowered.

With respect to the raising and lowering of the fuselage 25, the aircraft itself provides the mechanism by which this is accomplished, except for the motive power which may be manual as in the case of the structure shown in the drawings, or it may be mechanical as, for example, by connection of an electric motor to the shaft 54 of the winch. In either event, however, the mechanism provided by the aircraft effectively supports, lifts and lowers the major weight thereof whenever the fuselage is moved between its erect and folded positions.

As is most apparent in FIG. 1, the compartment 27, and especially the load carrying floor thereof, is suspended below the fuselage and hangs from the various struts 72, 73, 74 and 81. Thus, the compartment 27 and floor thereof, are unusually free of flight loads, and the center of load of the cargo compartment is in substantial alignment with the center of lift of the rotor assembly 30. This arrangement affords considerable flight stability and is also advantageous in converting the helicopter into an aerial crane wherein the platform sections 95 and 96 are swung away from their generally horizontal floor-defined position and a cable is dropped through the opening that remains after such removal of the platform sections. Such cable, or a winch, may be secured to the fuselage section 25 by hook structure 140.

In flight, the load or weight (i.e., personnel, passengers, cargo, etc.) supported within the compartment 27 is transferred to the fuselage 25 essentially as a tensile force which appears in each of the struts except for the struts 73, because the only compressional forces active against the fuselage section 25 are those restraining counter clockwise swinging movement of the compartment, its floor and associated components which tend to urge the struts 72, 74 and 81 into vertical orientation. Further, no compartment loads or forces are transmitted to the tail boom 26 which, then, is adequately supported by a cantilever suspension and can extend freely from the fuselage section 25.

Access to the cargo section of the compartment 27 is afforded through the large open sides thereof and through the large opening at the rear end portion of the compartment. In this latter respect, and as stated heretofore, the tail boom 26 and connector section 38 of the fuselage are of cantilever construction and are wholly located above the compartment with no surface areas thereof being disposed below the ceiling of the compartment. Consequently, the tail boom does not close, seal or otherwise diminish the rear opening into the cargo compartment, whereby the effective size of such opening is established by its dimensional limits.

As is seen most clearly in FIGURES 1 and 3, all of the struts interconnecting the fuselage section 25 and the floor or platform of the aircraft are essentially located at the four corner portions of the cargo compartment; and since the interior of the cargo compartment is substantially unobstructed by such struts, it has a relatively large volume or cargo-carrying capacity with ready access being provided thereto through its sides and rear. Access is also provided to the cargo compartment when the floor or platform section thereof is folded upwardly and into general adjacency with the backrest 111a whereat it may be secured by any suitable means as, for example, by straps. As a result of the large unobstrucex volume of the cargo section of the compartment, it is readily convertible into a cargo carrier, a personnel transport, a litter carrier for medical evacuation, it may serve as an airborne weapons platform, and it also permits use of the aircraft as an aerial crane. In all events, the payload being carried by the aircraft is located directly below the center of lift thereof, which makes the aircraft exceptionally easy to fly.

The lower frame and platform structure are connected directly to the fuselage section 25, and the tail boom is mechanically isolated from such lower frame and platform structure wherefore no force couple exists therebetween. As a consequence, no weight loads are transmitted from the lower frame and platform structure to the tail boom and, therefore, the tail boom can extend rearwardly from the fuselage section 25 and be secured thereto solely by means of a cantilever suspension and with substantially no surface areas of the tail boom being located below the ceiling of the cargo compartment— which ceiling, quite apparently, is defined by the lower surface of the fuselage section 25. Therefore, the high fuselage and tail boom assembly permit ready access into the cargo compartment through its rear access opening since such opening its unobstructed by the tail boom.

The aircraft is a self-contained unit that can be quickly and easily folded into a collapsed condition, as heretofore described, without the use of special tools. Not only does the collapsing of the aircraft reduce the volume thereof for storage, transport and handling, but it also facilitates concealment of the aircraft by camouflage because of its volumetric reduction (it has approximately a 40% smaller silhouette when folded) and also because the typical helicopter silhouette is changed. Furthermore, ease of maintenance is implemented by the foldability in that the landing gear may be folded to reduce the height of the engine and rotor assembly and bring them into easy reach of workmen, or the fuselage may be partially collapsed to any desired elevation to accomplish the same result, or the engine and rotor assembly may be lowered by utilizing both of these folding procedures.

The pivot wheels defining one of the fulcrums can also be used for ground handling of the aircraft to permit it to be rolled from place to place either before or after the landing gear 28 is retracted. Quite apparently, if the wheels are to be used for this purpose when the landing gear is in its extended position, the wheels in their lowermost position should extend slightly below the plane defined by the ground-engaging landing skids; and in this event, it may be necessary to rock the aircraft forwardly onto the curved forward end portions of the skids 46a and 46b to permit insertion and proper positioning of the wheels. The aircraft may be equipped with side panels, door, an engine cowling, and other conventional trim features, which have been omitted from the drawings for purposes of clarity and simplicity.

While in the foregoing specification an embodiment of the invention has been set forth in considerable detail for purposes of making an adequite disclosure thereof, it will be apparent to those skilled in the art that numerous changes may be made in such details without departing from the spirit and principles of the invention.

What is claimed is:

1. In combination with an aircraft having a landing gear and a longitudinally extending tail boom, fulcrum structure integrally provided by said aircraft and defining a structural component thereof and about which the aircraft is rockable into an elevated position in which said landing gear is then relieved of its aircraft-supporting function, the longitudinal distance between said fulcrum structure and the center of gravity of said aircraft being substantially less than the longitudinal distance between said fulcrum structure and the outer end portion of said tail boom so that a force applied to such outer end portion of said tail boom to effect rocking of the aircraft about said fulcrum structure may be of small magnitude relative to the opposing weight of said aircraft.

2. The combination of claim 1 in which said landing gear is selectively retractable when relieved of its aircraft-supporting function, and further including releasable fastener structure for securing said landing gear in the aircraft-supporting position thereof.

3. In combination with an aircraft having a landing gear and a longitudinally extending tail boom, a pair of longitudinally spaced fulcrum structures provided by said aircraft and about which it is rockable from one to the other into an elevated position in which the aircraft is finally supported by at least one of said fulcrum structures and said landing gear is then relieved of its aircraft supporting function, at least one of said fulcrum structures being integrally provided by said aircraft and defining a structural component thereof, the longitudinal distance between each of said fulcrum structures and the center of gravity of said aircraft being substantially less than the longitudinal distance between each of said fulcrum structures and the outer end portion of said tail boom so that a force applied to such outer end portion of the tail boom to effect rocking of the aircraft about each of said fulcrum structures may be of small magnitude relative to the opposing weight of said aircraft.

4. The combination of claim 3 in which said landing gear is selectively retractable when relieved of its aircraft-supporting function, and further including releasable fastener structure for securing said landing gear in the aircraft-supporting position thereof.

5. The combination of claim 3 in which at least one of said fulcrum structures is selectively movable into and out of ground-engaging positions, and further comprising structure for securing said one fulcrum structure in either position thereof.

6. The combination of claim 5 in which the other of said fulcrum structures is also selectively movable into and out of ground-engaging positions, and further including structure for securing the other of said fulcrum structures in either position thereof.

7. The combination of claim 3 in which at least one of said fulcrum structures is vertically adjustable to determine the elevation of the aircraft supported thereby relative to the ground.

8. The combination of claim 7 in which the other of said fulcrum structures is also vertically adjustable to determine the elevation of the aircraft supported thereby relative to the ground.

9. In combination with an aircraft having a landing gear and a longitudinally extending tail boom, a pair of longitudinally spaced fulcrum structures provided by said aircraft and about which it is rockable from one to the other into an elevated position in which the aircraft is finally supported by at least one of said fulcrum structures and said landing gear is then relieved of its aircraft supporting function, one of said fulcrum structures being defined by a floor section of said aircraft which is selectively movable between floor and fulcrum-forming positions, and structure for securing said one fulcrum structure in each position thereof, the longitudinal distance between each of said fulcrum structures and the center of gravity of said aircraft being substantially less than the longitudinal distance between each of said fulcrum structures and the outer end portion of said tail boom so that a force applied to such outer end portion of the tail boom to effect rocking of the aircraft about each of said fulcrum structures may be of small magnitude relative to the opposing weight of said aircraft.

10. In combination with an aircraft having a landing gear and a longitudinally extending tail boom, a pair of longitudinally spaced fulcrum structures provided by said aircraft and about which it is alternately and successively rockable from one to the other into an elevated position in which the aircraft is then supported by at least one of said fulcrum structures and said landing gear is relieved of its aircraft supporting function, one of said fulcrum structures being defined by a floor section of said aircraft which is selectively movable between floor and fulcrum-forming positions, structure for securing said one fulcrum structure in each position thereof, the longitudinal distance between each of said fulcrum structures and the center of gravity of said aircraft being substantially less than the longitudinal distance between each of said fulcrum structures and the outer end portion of said tail boom so that a force applied to such outer end portion of the tail boom to effect rocking of the aircraft about each of said fulcrum structures may be of small magnitude relative to the opposing weight of said aircraft, said landing gear being foldable into a retracted position when relieved of its aircraft-supporting function and releasable fastener structure for securing said landing gear in the aircraft-supporting position thereof.

11. The combination of claim 10 in which said one fulcrum structure is vertically adjustable to determine the elevation of the aircraft when supported thereby relative to the ground.

12. The combination of claim 11 in which the other of said fulcrum structures is selectively movable into and out of ground-engaging position and is also vertically adjustable to determine the elevation of the aircraft when supported thereby with respect to the ground, and further including structure for securing the other of said fulcrum structures in such positions thereof.

13. In a rotary wing aircraft, platform-defining frame structure integrally provided by said aircraft and normally having a generally horizontal disposition, a fuselage section, a plurality of struts connected with said frame structure and fuselage section for normally supporting the latter in a flight-ready condition in spaced relation above said frame structure to define a compartment therewith, said struts being connected with said frame structure and fuselage section to afford selective downward movement of said fuselage section into a collapsed condition of adjacency with said frame structure, and releasable fastener structure for constraining said fuselage section in the flight-ready position thereof.

14. In a rotary wing aircraft, platform-defining frame structure integrally provided by said aircraft and normally having a generally horizontal disposition, a fuselage section, a plurality of struts connected with said frame structure and fuselage section for normally supporting the latter in a flight-ready condition in spaced relation above said frame structure to define a compartment therewith, said struts being connected with said frame structure and fuselage section to afford selective downward movement of said fuselage section into a collapsed condition of adjacency with said frame structure, releasable fastener structure for constraining said fuselage section in the flight-ready position thereof, and selectively operable mechanism contained within said aircraft for selectively moving said fuselage section between the flight-ready and collapsed conditions thereof.

15. In a rotary wing aircraft, platform-defining frame structure integrally provided by said aircraft and normally having a generally horizontal disposition, a fuselage section having a deck for receiving an engine thereon, a plurality of struts pivotally connected with said frame structure and fuselage section for normally supporting the latter in a flight-ready condition in spaced relation above said frame structure to define a compartment therewith and affording selective downward swinging movement of said fuselage section into a collapsed condition of adjacency with said frame structure, releasable fastener structure for constraining said fuselage section in the flight-ready position thereof, and selectively operable mechanism contained within said aircraft for selectively moving said fuselage section between the flight-ready and collapsed conditions thereof.

16. The aircraft of claim 15 in which said releasable fastener structure comprises strut components extending between said frame structure and fuselage section and being releasably secured to one to constrain the fuselage section against articulation.

17. The aircraft of claim 15 in which said mechanism comprises a winch and pulley system effectively operable between said fuselage section and frame structure.

18. In a rotary wing aircraft, a platform-defining frame structure normally having a generally horizontal disposition, a fuselage section having a deck for receiving an engine thereon, a plurality of struts pivotally connected with said frame structure and fuselage section for normally supporting the latter in a flight-ready condition in spaced relation above said frame structure to define a compartment therewith and affording selective downward and forward swinging movement of said fuselage section into a collapsed condition of adjacency with said frame structure within the space otherwise forming said compartment, releasable fastener structure for constraining said fuselage section in the flight-ready position thereof, and selectively operable mechanism contained within said aircraft for selectively moving said fuselage section between the flight-ready and collapsed conditions thereof, said compartment including both a cargo space and a pilot's cabin equipped with seat and flight-control components selectively movable into retracted positions to accommodate said fuselage section in the collapsed condition thereof.

19. In a rotary wing aircraft, a lower platform and frame structure forming a permanent load-receiving component of the aircraft and defining a compartment floor integrally comprised by said aircraft, a fuselage section disposed above a portion of said floor and defining a cargo compartment therewith, a plurality of frame elements extending between said fuselage section and compartment floor to structurally interconnect the same, said frame elements being located essentially at the corner portions of said cargo compartment to provide the same with substantially unobstructed access through the sides and rear thereof, and a cantilever tail boom secured to said fuselage section and extending rearwardly therefrom generally along the longitudinal axis thereof and substantially entirely above the upper extremity of said cargo compartment, said aircraft being essentiallly devoid of structural components both at and rearwardly adjacent said cargo compartment which would interfere with rear access thereto.

20. In a rotary wing aircraft having a rotor assembly and engine drivingly connected thereto, a fuselage section having a deck fixedly secured to said engine, a lower platform and frame structure integrally comprised by said aircraft and defining a compartment floor forming a permanent load-receiving component of the aircraft, a plurality of struts extending downwardly from said fuselage section and being pivotally connected to both said fuselage section and said platform and frame structure to suspend the latter in spaced relation with said fuselage section, said platform and frame structure and said fuselage section defining a cargo compartment oriented directly below the center of lift of said aircraft, said struts being located essentially at the corner portions of said cargo compartment to provide the same with substantially unobstructed access through the sides and rear thereof, torsion strut structure extending between and secured to said fuselage section and said platform and frame structure to fixedly constrain the latter against angular displacements with respect to said fuselage section, and a cantilever tail boom secured to said fuselage and extending rearwardly therefrom generally along the longitudinal axis thereof and substantially entirely above the upper extremity of said cargo compartment, said aircraft being essentially devoid of structural components both at and rearwardly adjacent said cargo compartment which would interfere with rear access thereto.

21. In a rotary wing aircraft, a lower platform and frame structure integrally comprised by said aircraft and defining a compartment floor forming a permanent load-receiving component of the aircraft, a fuselage section disposed above a portion of said floor and defining the ceiling of a cargo compartment formed therewith, a plurality of frame elements extending between said fuselage section and compartment floor to structurally interconnect the same, at least certain of said frame elements being located adjacent the rear of said cargo compartment and such certain frame elements being essentially at the corner portions thereof and defining a substantially unobstructed rear access opening thereinto, and a cantilever tail boom secured to said fuselage section and extending rearwardly therefrom generally along the longitudinal axis thereof, substantially no portion of said boom being disposed below the ceiling of said cargo compartment so that access thereto through such rear opening is not impeded by said tail boom and said aircraft being otherwise essentially devoid of structural components both at and rearwardly adjacent said cargo compartment which would interfere with rear access thereto.

22. In a rotary wing aircraft having a landing gear and a longitudinally extending tail boom, platform-defining frame structure normally having a generally horizontal disposition, a fuselage section secured to said tail boom, a plurality of struts connected with said frame structure and fuselage section for normally supporting the latter in a flight-ready condition in spaced relation above said frame structure to define a compartment therewith, said struts being connected with said frame structure and fuselage section to afford selective downward movement of said fuselage section into a collapsed condition of adjacency with said frame structure, releasable fastener structure for constraining said fuselage section in the flight-ready position thereof, fulcrum structure provided by said aircraft and about which it is rockable into a position in which said landing gear is relieved of its aircraft-supporting function, the longitudinal distance between said fulcrum structure and the center of gravity of said aircraft being substantially less than the longitudinal distance between said fulcrum structure and the outer end portion of said tail boom so that a force applied to such outer end portion of said tail boom to effect rocking of the aircraft about said fulcrum structure may be of small magnitude relative to the opposing weight of said aircraft.

23. In a rotary wing aircraft having a landing gear and a longitudinally extending tail boom, platform-defining frame structure normally having a generally horizontal disposition, a fuselage section secured to said tail boom, a plurality of struts connected with said frame structure and fuselage section for normally supporting the latter in a flight-ready condition in spaced relation above said frame structure to define a compartment therewith, said struts being connected with said frame structure and fuselage section to afford selective downward movement of said fuselage section into a collapsed condition of adjacency with said frame structure, releasable fastener structure for constraining said fuselage section in the flight-ready position thereof, selectively operable mechanism contained within said aircraft for selectively moving said fuselage section between the flight-ready and collapsed conditions thereof, a pair of longitudinally spaced fulcrum structures provided by said aircraft and about which it is alternately rockable into an elevated position in which the aircraft is supported by at least one of said fulcrum structures and said landing gear is relieved of its aircraft-supporting function, the longitudinal distance between each of said fulcrum structures and the center of gravity of said aircraft being substantially less than the longitudinal distance between each of said fulcrum structures and the outer end portion of said tail boom so that a force applied to such outer end portion of the tail boom to effect rocking of the aircraft about said fulcrum structures may be of small magnitude relative to the opposing weight of the said aircraft.

24. In a rotary wing aircraft having a landing gear and a longitudinally extending tail boom, platform-defining frame structure normally having a generally horizontal disposition, a fuselage section secured to said tail boom, a plurality of struts pivotally connected with said frame structure and fuselage section for normally supporting the latter in a flight-ready condition in spaced relation above said frame structure to define a compartment therewith and affording selective downward swinging movement of said fuselage section into a collapsed condition of adjacency with said frame structure, releasable fastener structure for constraining said fuselage section in the flight-ready position thereof, selectively operable mechanism contained within said aircraft for selectively moving said fuselage section between the flight-ready and collapsed conditions thereof, a pair of longitudinally spaced fulcrum structures provided by said aircraft and about which it is alternately rockable into an elevated position in which the aircraft is supported by at least one of said fulcrum structures and said landing gear is relieved of its aircraft-supporting function, one of said fulcrum structures being provided by said platform-defining frame structure and being selectively movable between platform and fulcrum-forming positions, and structure for securing said one fulcrum structure in each position thereof, the longitudinal distance between each of said fulcrum structures and the center of gravity of said aircraft being substantially less than the longitudinal distance between each of said fulcrum structures and the outer end portion of said tail boom so that a force applied to such outer end portion of the tail boom to effect rocking of the aircraft about said fulcrum structures may be of small magnitude relative to the opposing weight of said aircraft.

25. In a rotary wing aircraft having a landing gear and a longitudinally extending tail boom, a platform-defining frame structure normally having a generally horizontal disposition, a fuselage section secured to said tail boom, a plurality of struts pivotally connected with said frame structure and fuselage section for normally supporting the latter in a flight-ready condition in spaced relation above said frame structure to define a compartment therewith and affording selective downward and forward swinging movement of said fuselage section into a collapsed condition of adjacency with said frame structure within the space otherwise forming said compartment, releasable fastener structure for positioning said fuselage section in the flight-ready position thereof, selectively operable mechanism contained within said aircraft for selectively moving said fuselage section between the flight-ready and collapsed conditions thereof, said compartment including both a cargo space and a pilot's cabin equipped with seat and flight-control components selectively movable into retracted positions to accommodate said fuselage section in the collapsed condition thereof, a pair of longitudinally spaced fulcrum structures provided by said aircraft and about which it is alternately rockable into an elevated position in which the aircraft is supported by at least one of said fulcrum structures and said landing gear is relieved of its aircraft-supporting function, one of said fulcrum structures being provided by said platform-defining frame structure and being selectively movable between platform and fulcrum-forming positions, and structure for securing said one fulcrum structure in each position thereof, the longitudinal distance between each of said fulcrum structures and the center of gravity of said aircraft being substantially less than the longitudinal distance between each of said fulcrum structures and the outer end portion of said tail boom so that a force applied to such outer end portion of the tail boom to effect rocking of the aircraft about said fulcrum structures may be of small magnitude relative to the opposing weight of said aircraft, said landing gear being foldable into a retracted position when relieved of its aircraft-supporting function.

26. In a rotary wing aircraft having a rotor assembly and engine drivingly connected thereto, a fuselage section having a deck fixedly secured to said engine, a lower platform and frame structure defining a compartment floor and being integrally comprised by said aircraft, a plurality of struts extending downwardly from said fuselage section and being pivotally connected to both said fuselage section and said platform and frame structure to suspend the latter in spaced relation with said fuselage section, said platform and frame structure and said fuselage section defining a cargo compartment oriented directly below the center of lift of said aircraft, torsion-strut structure extending between and secured to said fuselage section and said platform and frame structure to fixedly constrain the latter against angular displacements with respect to said fuselage section whereby substantially no longitudinally oriented bending moments are imparted to said first mentioned plurality of struts when said aircraft is in flight, a landing gear assembly secured to said lower platform and frame structure, a tail boom secured to said fuselage section and extending longitudinally therefrom, fulcrum structure provided by said aircraft and about which it is rockable into position in which said landing gear is relieved of its aircraft-supporting function, the longitudinal distance between said fulcrum structure and the center of gravity of said aircraft being substantially less than the longitudinal distance between said fulcrum structure and the outer end portion of said tail boom so that a force applied to such outer end portion of the tail boom to effect rocking of the aircraft about said fulcrum structure may be of small magnitude relative to the opposing weight of said aircraft.

27. In a rotary wing aircraft having a rotor assembly and engine drivingly connected thereto, a lower platform and frame structure defining a compartment floor integrally provided by said aircraft and normally having a generally horizontal disposition, a fuselage section having a deck fixedly secured to said engine, a plurality of struts extending downwardly from said fuselage section and being pivotally connected to both said fuselage section and said platform and frame structure to suspend the latter in spaced relation with said fuselage section when said aircraft is in flight and for normally supporting said fuselage section in a flight-ready condition in spaced relation above said lower platform and frame structure to define a compartment therewith, said struts affording selective downward pivotal movement of said fuselage section into a collapsed condition of adjacency with said frame structure, releasable fastener structure for constraining said fuselage section in the flight-ready position thereof, and including torsion-strut structure extending between said fuselage section and said platform and frame structure to fixedly constrain the latter against angular displacements with respect to said fuselage section, and a cantilever tail boom secured to said fuselage section and extending rearwardly therefrom generally along the longitudinal axis thereof, said tail boom being structurally isolated from said lower platform and frame structure so that no force couple is operative therebetween.

28. In a rotary wing aircraft having a rotor assembly and engine drivingly connected thereto, a fuselage section having a deck fixedly secured to said engine, a lower platform and frame structure normally having a generally horizontal disposition and defining a compartment floor, a plurality of struts extending between and being pivotally connected to both said fuselage section and said platform and frame structure to suspend the latter in spaced relation with said fuselage section when said aircraft is in flight and for normally supporting the fuselage section in a flight-ready condition in spaced relation above said frame structure to define a compartment therewith, said struts affording selective downward pivotal movement of said fuselage section into a collapsed condition of adjacency with said frame structure, releasable fastener structure for constraining said fuselage section in the flight-ready position thereof and including torsion-strut structure extending between said fuselage section and said platform and frame structure to fixedly constrain the latter against angular displacements with respect to said fuselage section when the aircraft is in flight, a cantilever tail boom secured to said fuselage section and extending rearwardly therefrom generally along the longitudinal axis thereof, said tail boom being structurally isolated from said lower platform and frame structure so that no force couple is defined therebetween, a landing gear assembly connected with said lower platform and frame structure, fulcrum structure provided by said aircraft and about which it is rockable into a position in which said landing gear is relieved of its aircraft-supporting function, the longitudinal distance between said fulcrum structure and the center of gravity of said aircraft being substantially less than the longitudinal distance between said fulcrum structure and the outer end portion of said tail boom so that a force applied to such outer end portion of said tail boom to effect rocking of the aircraft about said fulcrum structure may be of small magnitude relative to the opposing weight of said aircraft.

29. In a rotary wing aircraft having a rotor assembly and engine drivingly connected thereto, a fuselage section having a deck fixedly secured to said engine, a lower platform and frame structure defining a compartment floor and normally having a generally horizontal disposition, a plurality of struts pivotally connected to both said fuselage section and said platform and frame structure to suspend the latter in spaced relation with said fuselage section when said aircraft is in flight and normally supporting the fuselage section in a flight-ready condition in spaced relation above said platform and frame structure to define a compartment therewith, said compartment including both a cargo compartment located directly below the center of lift of said aircraft, and a pilot's cabin equipped with seat and flight-control components selectively movable into retracted positions to accommodate said fuselage section in the collapsed condition thereof, said struts affording selective downward and forward swinging movement of said fuselage section into a collapsed condition of adjacency with said platform and frame structure into the space otherwise forming said compartment and being located essentially at the corner portions of said cargo compartment to provide the same with substantially unobstructed access through the sides and rear thereof, releasable fastener structure for selectively maintaining said fuselage section in the flight-ready position thereof and including torsion-strut structure extending between said fuselage section and said platform and frame structure to fixedly constrain the latter against angular displacements with respect to the fuselage section, a cantilever tail boom secured to said fuselage section and extending rearwardly therefrom along the longitudinal axis thereof, a landing gear assembly connected with said platform and frame structure, a pair of longitudinally spaced fulcrum structures provided by said aircraft and about which it is alternately rockable into an elevated position in which the aircraft is supported by at least one of said fulcrum structures and said landing gear is relieved of its aircraft-supporting function, one of said fulcrum structures being provided by said compartment floor and being selectively movable between floor and fulcrum-forming positions, and structure for releasably securing said one fulcrum structure in each position thereof, the longitudinal distance between each of said fulcrum structures and the center of gravity of said aircraft being substantially less than the longitudinal distance between each of said fulcrum structures and the outer end portion of said tail boom so that a force applied to such outer end portion of the tail boom to effect rocking of the aircraft about said fulcrum structure may be of small magnitude relative to the opposing weight of said aircraft, said landing gear being foldable into a retracted position when relieved of its aircraft-supporting function.

30. In a rotary wing aircraft, platform-defining frame structure normally having a generally horizontal disposition, a fuselage section having a deck for receiving an engine thereon, a plurality of struts pivotally connected with said frame structure and fuselage section for normally supporting the latter in a flight-ready condition in spaced relation above said frame structure to define a compartment therewith and affording selective downward swinging movement of said fuselage section into a collapsed condition of adjacency with said frame structure, and releasable fastener structure for constraining said fuselage section in the flight-ready position thereof, said struts together with said frame structure and fuselage section defining a parallelogram configuration wherein said fuselage section and struts are swingable about the axes defined by the respective pivotal connections of said struts with said frame structure.

31. In a rotary wing aircraft, platform-defining frame structure normally having a generally horizontal disposition, a fuselage section having a deck for receiving an engine thereon, a plurality of struts pivotally connected with said frame structure and fuselage section for normally supporting the latter in a flight-ready condition in spaced relation above said frame structure to define a compartment therewith and affording selective downward swinging movement of said fuselage section into a collapsed condition of adjacency with said frame structure, releasable fastener structure for constraining said fuselage section in the flight-ready position thereof, and selectively operable mechanism contained within said aircraft for selectively moving said fuselage section between the flight-ready and collapsed conditions thereof, said struts together with said frame structure and fuselage section defining a parallelogram configuration wherein said fuselage section and struts are swingable about the axes defined by the respective pivotal connections of said struts with said frame structure.

32. In a rotary wing aircraft, a lower platform and frame structure forming a permanent load-receiving component of the aircraft and defining a compartment floor, a fuselage section disposed above a portion of said floor and defining a cargo compartment therewith, a plurality of frame elements extending between said fuselage section and compartment floor to structurally interconnect the same, said frame elements being located essentially at the corner portions of said cargo compartment to provide the same with substantially unobstructed access through the sides and rear thereof, and a cantilever tail boom secured to said fuselage section and extending rearwardly therefrom generally along the longitudinal axis thereof and substantially entirely above the upper extremity of said cargo compartment, said aircraft being essentially devoid of structural components both at and rearwardly adjacent said cargo compartment which would interfere with rear access thereto, said platform being selectively movable between floor-forming and open positions, whereby substantially unobstructed access is also provided to said cargo compartment through the bottom thereof in the open position of said platform.

33. In a rotary wing aircraft having a rotor assembly and engine drivingly connected thereto, a fuselage section having a deck fixedly secured to said engine, a lower platform and frame structure defining a compartment floor forming a permanent load-receiving component of the aircraft, a plurality of struts extending downwardly from said fuselage section and being pivotally connected to both said fuselage section and said platform and frame structure to suspend the latter in spaced relation with said fuselage section, said platform and frame structure and said fuselage section defining a cargo compartment oriented directly below the center of lift of said aircraft, torsion-strut structure extending between and secured to said fuselage section and said platform and frame structure to fixedly constrain the latter against angular displacements with respect to said fuselage section, whereby substantially no longitudinally oriented bending moments are imparted to said first mentioned plurality of struts when said aircraft is in flight, said platform being selectively movable between floor-forming and open positions, and means for securing load-carrying cable structure to said fuselage so as to extend downwardly therefrom through the open bottom of said cargo compartment in substantial alignment with the center of lift of said aircraft.

34. In a rotary wing aircraft having a rotor assembly and engine drivingly connected thereto, a fuselage section having a deck fixedly secured to said engine, a lower platform and frame structure defining a compartment floor forming a permanent load-receiving component of the aircraft, a plurality of struts extending downwardly from said fuselage section and being pivotally connected to both said fuselage section and said platform and frame structure to suspend the latter in spaced relation with said fuselage section, said platform and frame structure and said fuselage section defining a cargo compartment oriented directly below the center of lift of said aircraft, said struts being located essentially at the corner portions of said cargo compartment to provide the same with substantially unobstructed access through the sides and rear thereof, torsion strut structure extending between and secured to said fuselage section and said platform and frame structure to fixedly constrain the latter against angular displacements with respect to said fuselage section, and a cantilever tail boom secured to said fuselage and extending rearwardly therefrom generally along the longitudinal axis thereof and substantially entirely above the upper extremity of said cargo compartment, said aircraft being essentially devoid of structural components both at and rearwardly adjacent said cargo compartment which would interfere with rear access thereto, said platform being selectively movable between floor-forming and open positions, whereby substantially unobstructed access is also provided to said compartment through the bottom thereof in the open position of said platform.

References Cited by the Examiner

UNITED STATES PATENTS

| | | | |
|---|---|---|---|
| 1,417,017 | 5/22 | Ardo | 244—100 |
| 2,518,561 | 8/50 | Meschwitzer | 280—11 |
| 2,549,886 | 4/51 | Buivid | 244—17.11 |
| 2,827,251 | 3/58 | Doman | 244—17.11 X |
| 2,876,969 | 3/59 | Tydon | 244—118 |
| 2,973,923 | 3/61 | Sznycer | 244—17.11 |
| 2,989,273 | 6/61 | Grunfelder | 244—118 |
| 3,002,710 | 10/61 | Marchetti | 244—17.17 |

FOREIGN PATENTS

| | | |
|---|---|---|
| 725,820 | 3/55 | Great Britain. |
| 862,001 | 3/61 | Great Britain. |

FERGUS S. MIDDLETON, *Primary Examiner.*

MILTON BUCHLER, *Examiner.*